United States Patent
Suga (10) Patent No.: US 6,975,760 B2
(45) Date of Patent: Dec. 13, 2005

(54) SHARED IMAGE GENERATION APPARATUS AND METHOD, COMPUTER PROGRAM, AND COMPUTER READABLE STORAGE MEDIUM

(75) Inventor: Yuji Suga, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 941 days.

(21) Appl. No.: 09/949,617

(22) Filed: Sep. 12, 2001

(65) Prior Publication Data

US 2002/0032866 A1 Mar. 14, 2002

(30) Foreign Application Priority Data

Sep. 13, 2000 (JP) .......................................... 2000-278296

(51) Int. Cl.[7] .................................................. G06K 9/00
(52) U.S. Cl. ........................ 382/171; 382/100; 345/33
(58) Field of Search ....................... 713/176; 382/284, 382/294

(56) References Cited

U.S. PATENT DOCUMENTS 5,644,689 A * 7/1997 Ban et al. .................... 345/424
6,094,483 A * 7/2000 Fridrich et al. ............... 380/28
6,208,735 B1 * 3/2001 Cox et al. ..................... 380/54
6,209,097 B1 * 3/2001 Nakayama et al. .......... 713/193
6,292,593 B1 * 9/2001 Nako et al. .................. 382/284

OTHER PUBLICATIONS

A. Shamir, "How To Share A Secret," Nov., 1979, Communications of the ACM, vol. 22, No. 11, pp. 612–613.

M. Naor and A. Shamir, "Visual Cryptography," Advances in Cryptology—Eurocrypt, 1994, Lecture Notes in Computer Science 950, pp. 1–12, Springer–Verlag.

Okamoto, Tatsuaki and Yamamoto, Hirosuke, "Modern Cryptography", Sangyo Tosho, pp. 209–219, 1997.

* cited by examiner

Primary Examiner—Andrew W. Johns
Assistant Examiner—O'Neal R. Mistry
(74) Attorney, Agent, or Firm—Fitzpatrick, Cella, Harper & Scinto

(57) ABSTRACT

A shared image generation apparatus generates a basis matrix on the basis of a graph, the vertex set of which corresponds to a set of a plurality of members to which shared images are to be distributed, and generates a plurality of shared images to be distributed to the plurality of members on the basis of the basis matrix and an externally input secret image to be shared. The plurality of generated shared images form the secret image when they are stacked up.

19 Claims, 12 Drawing Sheets

$$S0 = \begin{matrix} & & & & & \\ u1 & 0 & 1 & 1 & 1 & 0 \\ u2 & 1 & 0 & 1 & 1 & 0 \\ u3 & 1 & 1 & 0 & 1 & 0 \\ u4 & 1 & 1 & 1 & 0 & 0 \end{matrix}$$

$$S1 = \begin{matrix} u1 & 0 & 1 & 1 & 0 & 1 \\ u2 & 0 & 0 & 1 & 1 & 1 \\ u3 & 1 & 0 & 0 & 1 & 1 \\ u4 & 1 & 1 & 0 & 0 & 1 \end{matrix}$$

$$S00 = \begin{matrix} u1 & 1 & 0 & 0 & 0 & 0 & 1 & 1 \\ u2 & 0 & 1 & 0 & 0 & 0 & 1 & 1 \\ u3 & 0 & 0 & 1 & 0 & 0 & 1 & 1 \\ u4 & 0 & 0 & 0 & 1 & 0 & 1 & 1 \\ u5 & 0 & 0 & 0 & 0 & 1 & 1 & 1 \end{matrix}$$

$$S01 = \begin{matrix} u1 & 0 & 0 & 1 & 1 & 0 & 1 & 0 \\ u2 & 0 & 0 & 0 & 1 & 1 & 1 & 0 \\ u3 & 1 & 0 & 0 & 0 & 1 & 1 & 0 \\ u4 & 1 & 1 & 0 & 0 & 0 & 1 & 0 \\ u5 & 0 & 1 & 1 & 0 & 0 & 1 & 0 \end{matrix}$$

$$S10 = \begin{matrix} u1 & 0 & 1 & 0 & 0 & 0 & 1 & 1 & 0 \\ u2 & 1 & 0 & 1 & 0 & 0 & 0 & 1 & 0 \\ u3 & 0 & 1 & 0 & 1 & 0 & 1 & 0 \\ u4 & 0 & 0 & 1 & 0 & 1 & 1 & 0 \\ u5 & 1 & 0 & 0 & 1 & 0 & 1 & 0 \end{matrix}$$

$$S11 = \begin{matrix} u1 & 1 & 0 & 0 & 0 & 1 & 0 & 1 \\ u2 & 1 & 1 & 0 & 0 & 0 & 1 & 0 \\ u3 & 0 & 1 & 1 & 0 & 0 & 0 & 1 \\ u4 & 1 & 0 & 1 & 1 & 0 & 0 & 0 \\ u5 & 0 & 1 & 0 & 1 & 1 & 0 & 0 \end{matrix}$$

FIG. 11

$$S0 = \begin{matrix} u1 & 1 & 1 & 0 & 0 \\ u2 & 1 & 1 & 0 & 0 \end{matrix}$$

$$S1 = \begin{matrix} u1 & 1 & 1 & 0 & 0 \\ u2 & 0 & 0 & 1 & 1 \end{matrix}$$

FIG. 12

SHARED IMAGE GENERATION APPARATUS AND METHOD, COMPUTER PROGRAM, AND COMPUTER READABLE STORAGE MEDIUM

FIELD OF THE INVENTION

The present invention relates to the field of a shared image generation apparatus and method for sharing an objective image as secret information.

BACKGROUND OF THE INVENTION

Conventionally, upon managing secret information in an information processing apparatus such as a computer or the like, secret information may leak to a third party due to inadequate information management or intentional act of an administrator, and this poses a serious problem in a recent information processing environment in which a plurality of information processing apparatuses are connected via a communication network.

Hence, a scheme of sharing and distributing secret information to be managed among a plurality of members who form a given group in place of a specific person who manages secret information, and reconstructing (restoring) and using original secret information based on the shared and distributed information pieces only when that secret information is required has been proposed. This scheme is called a secret sharing scheme.

In the aforementioned secret sharing scheme, even when not all pieces of shared information distributed to the members of the group are available, it is possible to allow reconstructing original secret information. That is, in the conventional secret sharing scheme, even when some pieces of distributed shared information outflow, the entire secret information to be managed does not leak depending on the outflowed pieces of shared information. Also, even when some pieces of shared information are destroyed, original secret information can be reconstructed on the basis of the remaining pieces of shared information.

A (k, n)-threshold secret sharing scheme as an example of the secret sharing scheme having such feature encodes secret information S into n pieces of shared information $W\_i$ ($1 \leq i \leq n$). In this scheme, it is possible to reconstruct secret information S from arbitrary k ($k \leq n$) pieces of shared information, but it is impossible to obtain any information that relates to the secret information S from (k−1) or less pieces of shared information. Note that this scheme is proposed by A. Shamir "How to Share a Secret", Commun. of ACM, Vol. 22, No. 11, pp. 612–613, 1979, or Tatsuaki Okamoto and Hiroshi Yamamoto, "Modern Cryptography", Sangyo Tosho, pp. 209–219.

As a new type of such secret sharing scheme, a visual secret sharing scheme has also been proposed. In this scheme, images are used as secret information and shared information, and no mathematical operation is made upon reconstructing images as secret information.

As an example of such visual secret sharing scheme, a visual secret sharing scheme based on the (k, n)-threshold secret sharing scheme is proposed first by M. Naor and A. Shamir, Visual Cryptography (in Advances in Cryptology—Eurocrypt '94, Lecture Notes in Computer Science 950, pp. 1–12, Springer-Verlag). In this scheme, upon sharing a secret image as secret information to be managed in the form of a plurality of shared images, individual shared images are printed on media such as opaque slide films, OHP (overhead projector) sheets, or the like, which have transparency and can be physically stacked up (overlaid on) each other. Upon reconstructing an original secret image, the individual shared images need only be stacked up each other. In this way, the secret image can be reconstructed without any special cryptographic operations.

A practical visual secret sharing scheme based on the (k, n)-threshold secret sharing scheme will be explained below.

This method provides a mechanism in which n shared images are generated in advance from one secret image, and an original secret image can be reconstructed by stacking up k or more shared images, but information that relates to the secret image cannot be acquired even by stacking up (k−1) or less shared images. A secret image SI is a monochrome (binary) image, and each component SI(x, y) which forms that image is expressed by "0" if the pixel is white or "1" if the pixel is black.

In this case, each pixel which forms the secret image SI is expressed by m partial pixels on n shared images (that is, a partial pixel is expanded to m times that in the secret image). When a plurality of shared images are stacked up each other, white or black is visually reconstructed by the difference (i.e., contrast) between the white and black ratios of m partial pixels, thus obtaining an original secret image.

The forming method of shared images in the visual secret sharing scheme is as follows.

A basis matrix will be explained first. Each shared image is shared based on a basis matrix. Two different basis matrices are used upon forming shared images from a secret image. A basis matrix $S0$ is used when the pixel component of the secret image is 0, and a basis matrix $S1$ is used when the pixel component of the secret image is 1. Each basis matrix is an n×m matrix, and the rows of this matrix are indexed by a vertex set $\{u\_i | 1 \leq i \leq n\}$.

These basis matrices are prepared to have the following features for a given threshold value d ($1 \leq d \leq n$).

(1) The basis matrices $S0$ and $S1$ are binary matrices.

(2) For i that falls within the range $1 \leq i \leq n$, the weight (the number of components "1") of the ($u\_i$)-th row component of the basis matrix $S0$ equals to that of the ($u\_i$)-th row component of the basis matrix $S1$.

(3) The Hamming distance (i.e., the number of "1"s of vectors) of the vector obtained by selecting arbitrary k different row vectors of the basis matrix $S0$ and ORing the selected row vectors is less than d.

(4) The Hamming distance of the vector obtained by selecting arbitrary k different row vectors of the basis matrix $S1$ and ORing the selected row vectors is equal to or larger than d.

(5) For all "q"s which fall within the range $1 \leq q < k$, the Hamming distance of the vector obtained by selecting arbitrary q different row vectors of the basis matrix $S0$ and ORing the selected row vectors equals to the Hamming distance of the vector obtained by selecting arbitrary q different row vectors of the basis matrix $S1$ and ORing the selected row vectors.

To generate shared images, each component SI(x, y) of the externally input secret image SI undergoes the following processes.

(1) The basis matrix $S0$ is selected if SI(x, y) is 0 or Si if SI(x, y) is 1.

(2) An arbitrary permutation $\Phi$ is selected from an m-th order permutation group.

(3) An (x, y) component of each shared image $w\_i$ ($1 \leq i \leq n$) before sharing is set to be a value obtained by applying the permutation Φ the (u_i)-th row component (vector of m variables) of the basis matrix.

With these processes, shared images w_i ($1 \leq i \leq n$) expanded to m times are generated, thus providing a mechanism in which the original secret image SI can be reconstructed by stacking up k or more shared images, but the secret image SI cannot be obtained by stacking up (k−1) or less shared images.

Figure 11:
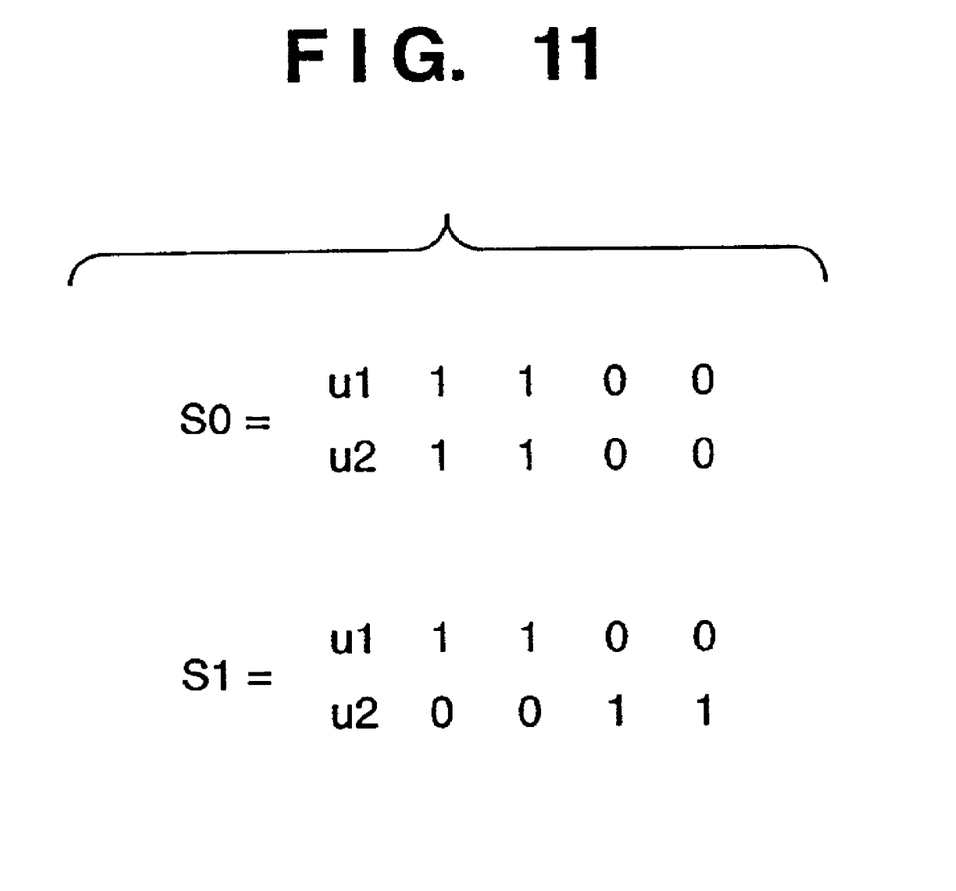
FIG. 11 exemplifies basis matrices which implement the conventional visual secret sharing scheme based on the (2, 2)-threshold secret sharing scheme.

FIG. 11 exemplifies basis matrices S0 and S1 (m=4) related to on a (2, 2)-threshold visual secret sharing scheme as an example of the conventional visual secret sharing scheme based on the (k, n)-threshold value secret sharing scheme.

Figure 12:
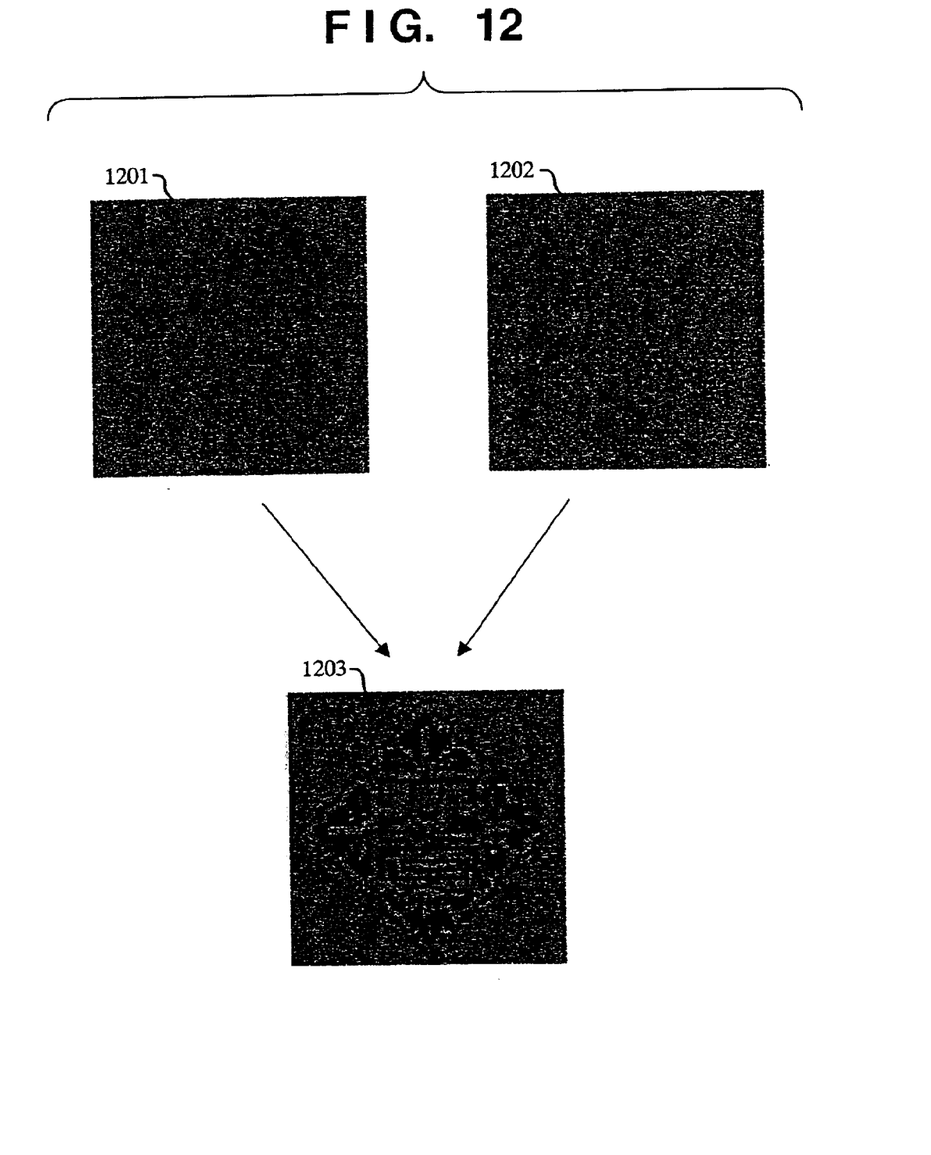
FIG. 12 shows shared images and a secret image reconstructed by stacking up these shared images in the prior art.

FIG. 12 shows an example of shared images formed based on the basis matrices exemplified in FIG. 11. In FIG. 12, a secret image 1203 is reconstructed by stacking up shared images 1201 and 1202.

In the conventional visual secret sharing scheme based on the (k, n)-threshold value secret sharing scheme, information pieces which form a secret image are equally distributed to shared images. However, in various activities in the real world, a permission of a specific member is required upon reconstructing secret information to be managed, or reconstructing is not permitted to a specific member constitution. In this way, various access structures (constraint conditions) may have to be imposed upon reconstructing secret information. For this reason, the scheme of equally distributing shared images to a plurality of members is not often suitable.

SUMMARY OF THE INVENTION

The present invention has been proposed to solve the conventional problems, and has as its object to provide a shared image generation apparatus and method, a computer program, and a computer readable storage medium with high secrecy and manageability.

In order to achieve the above object, a shared image generation apparatus according to the present invention is characterized by the following arrangement.

That is, a shared image generation apparatus for generating a plurality of shared images to be distributed to a plurality of members from a secret image to be managed, comprises graph input means for externally inputting a graph (undirected graph or weighted graph), a vertex set of which corresponds to a set of the plurality of members, matrix generation means for generating a basis matrix on the basis of the graph input by the graph input means, and shared image generation means for generating a plurality of shared images to be distributed to the plurality of members on the basis of the externally input secret image and the basis matrix acquired by the matrix generation means, wherein the plurality of shared images form the secret images when the shared images are stacked up.

For example, the plurality of members are a (a>2) members, and the shared image generation means generates the plurality of shared images to determine, whether or not the secret image can be reconstructed, on the basis of distances between vertices in the graph that correspond to the a members and form the graph (e.g., on the basis of a sum w of the calculated distances between vertices or a minimum distance y of the distances between vertices).

For example, the plurality of members are a (a>2) members, and the shared image generation means generates the plurality of shared images to reconstruct different secret images to the a members on the basis of distances between vertices in the graph that correspond to the a members and (e.g., on the basis of a sum w of the calculated distances between vertices, a minimum distance y of the distances between vertices, or a maximum distance z of the distances between vertices).

In order to achieve the above object, a shared image generation method according to the present invention is characterized by the following arrangement.

That is, a shared image generation method for generating a plurality of shared images to be distributed to a plurality of members from a secret image to be managed, comprises the graph input step of externally inputting a graph, a vertex set of which corresponds to a set of the plurality of members, the matrix generation step of generating a basis matrix on the basis of the graph input in the graph input step, and the shared image generation step of generating a plurality of shared images to be distributed to the plurality of members on the basis of the externally input secret image and the basis matrix acquired in the matrix generation step, wherein the plurality of shared images form the secret images when the shared images are stacked up.

For example, the plurality of members are a (a>2) members, and the shared image generation step includes the step of generating the plurality of shared images to determine, whether or not the secret image can be reconstructed, on the basis of distances between vertices in the graph that correspond to the a members.

For example, the plurality of members are a (a>2) members, and the shared image generation step includes the step of generating the plurality of shared images to reconstruct different secret images to the a members on the basis of distances between vertices in the graph that correspond to the members.

Note that the above object is also achieved by a program code (computer program) which implements the shared image generation apparatus and method with the above arrangements by a computer, and a computer readable storage medium that stores the program code.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of a shared image generation apparatus according to the present invention will now be described in detail in accordance with the accompanying drawings.

[First Embodiment]

The hardware arrangement of an information processing apparatus which can implement a shared image generation apparatus of this embodiment will be explained first.

Figure 7:
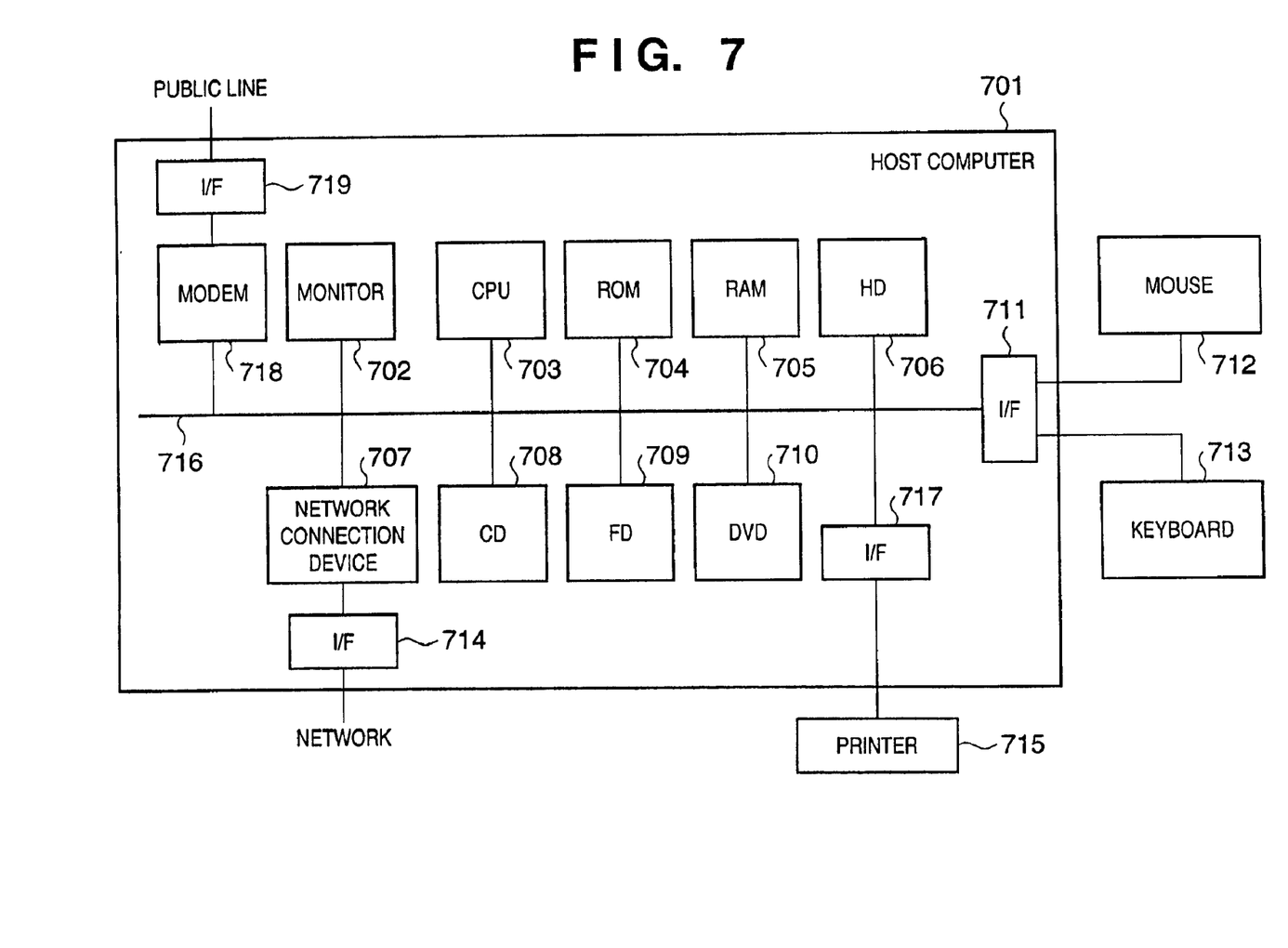
FIG. 7 is a block diagram of an information processing apparatus as a shared image generation apparatus in the first embodiment.

FIG. 7 is a block diagram of an information processing apparatus as a shared image generation apparatus in the first embodiment.

Referring to FIG. 7, a host computer 701 as a typical information processing apparatus is, e.g., a general personal computer, various user's instructions and the like are issued by inputs from a mouse 712 and keyboard 713, and text information and image information can be printed by a printer 715.

In the host computer 701, respective units (to be described below) are connected via a bus 716 to exchange various data. A monitor 702 is used to display instructions to the user, text information, and image information.

A CPU 703 controls the operations of respective internal units in accordance with a software program of, e.g., an information sharing process (to be described later) or the like, which is read out from a hard disk 706 or the like. A ROM 704 stores a specific image that is inhibited from being printed, and stores a required image processing program or the like in advance. A RAM 705 temporarily stores a program and text data to be processed so as to execute processes by the CPU 703.

A hard disk (HD) 706 is as an example of a large-capacity storage device, which saves text information, image information, a software program of, e.g., an information sharing process or the like, which is transferred to the RAM or the like upon execution. A CD drive 708 can read or write data from or on a CD (CD-R) as one of external storage media. An FD drive 709 can read and write data from and on an FD (floppy disk) as the CD drive 708. A DVD drive 710 can read and write data from and on a DVD (digital video disk) as the CD drive 708.

When an edit program or a printer driver is stored in the external storage medium such as a CD, FD, DVD, or the like, these programs may be installed on the HD 706, and may be transferred to the RAM 705 as needed.

An interface (I/F) 711 is connected to the mouse 712 or keyboard 713 to receive instructions input therefrom. A communication modem 718 is connected to an external network via an interface (I/F) 719 and, e.g., a public line. A network connection device 707 is connected to an external network via an interface (I/F) 714.

Figure 3:
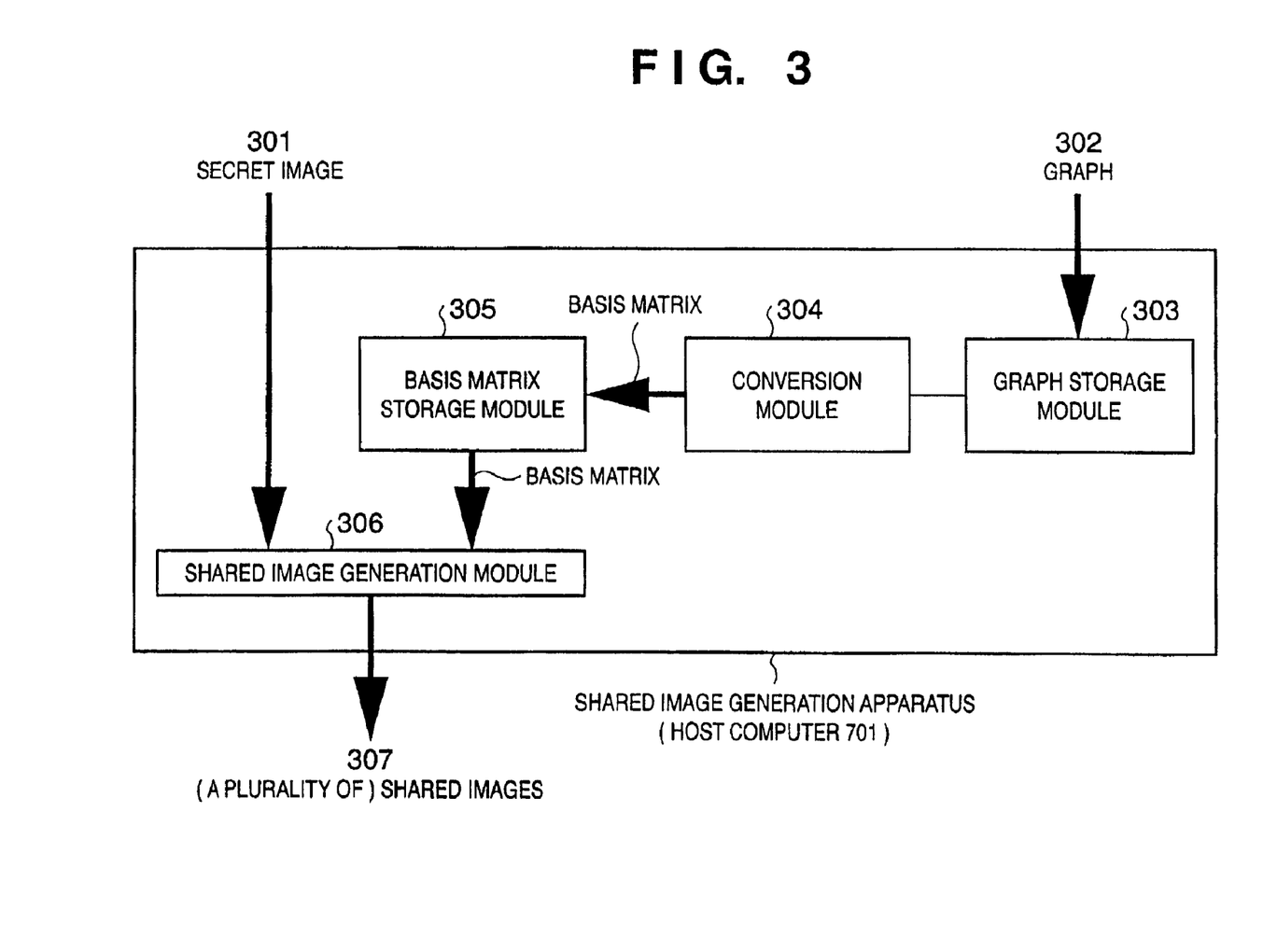
FIG. 3 is a diagram for explaining the functional arrangement of a shared image generation apparatus (FIG. 7) in the first embodiment.

FIG. 3 is a diagram for explaining the functional arrangement of the shared image generation apparatus (FIG. 7) in the first embodiment. Respective blocks shown in FIG. 3 represent functional units (modules) of a software program executed by the host computer 701 as the shared image generation apparatus.

Referring to FIG. 3, external inputs to the shared image generation apparatus include a secret image 301 and graph 302. The input graph 302 is stored in, e.g., the HD 706 by a graph storage module 303. A conversion module 304 that executes an operation corresponding to step S202 to be described later generates basis matrices on the basis of the graph 302, and the generated basis matrices are stored (reclaimed) in, e.g., the HD 706 by a basis matrix storage module 305.

A shared image generation module 306 generates a plurality of shared images 307 on the basis of the externally input secret image 301 and the basis matrices read out from the basis matrix storage module 305, and the plurality of generated shared images are output to, e.g., the printer 715.

Note that the graph 302 may be input to the shared image generation apparatus either synchronously, i.e., simultaneously with input of the secret image 301, or asynchronously, i.e., by inputting the graph and generating basis matrices in advance.

The information sharing process executed by the host computer 701 with the aforementioned hardware arrangement and functional arrangement will be explained below.

Figure 1:
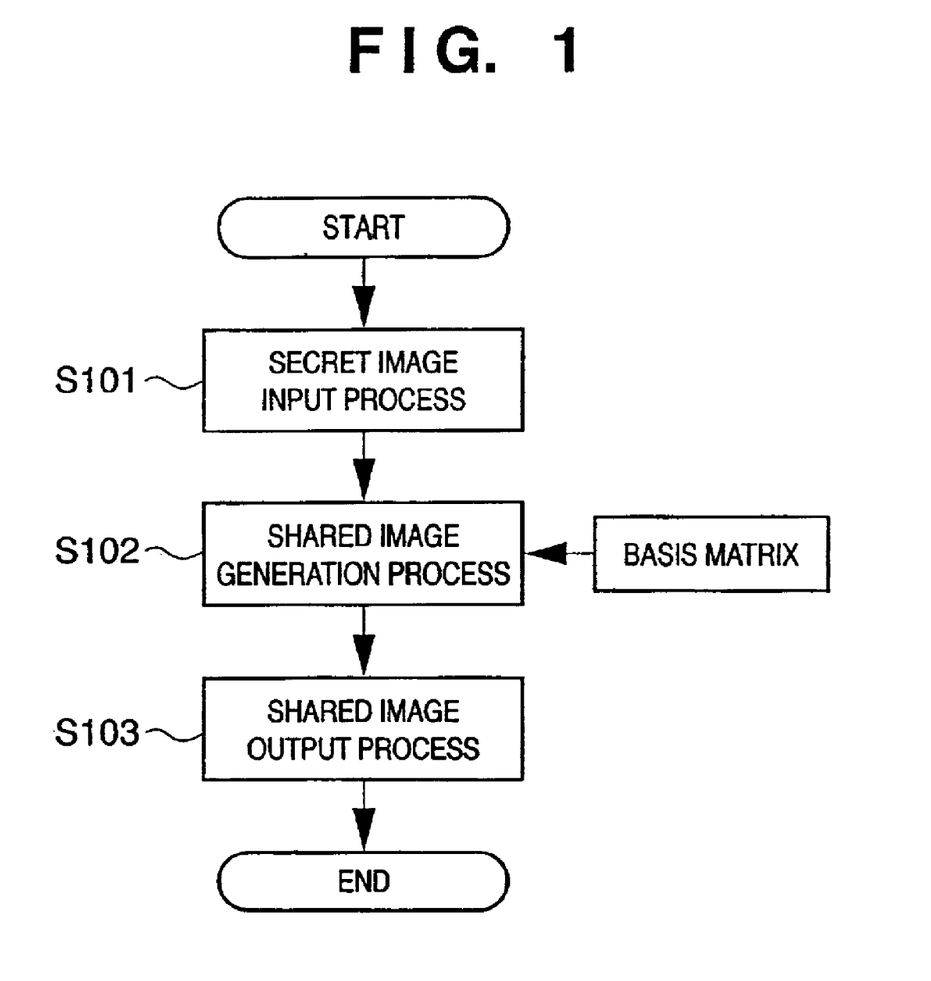
FIG. 1 is a flow chart showing an image sharing process according to the first embodiment of the present invention.

FIG. 1 is a flow chart showing an image sharing process in the first embodiment, and shows an outline of the sequence of a visual secret sharing scheme as a characteristic feature of this embodiment.

Referring to FIG. 1, an input process of a secret image to be shared is done via the interface 719 or 714, FD 709, or the like in step S101.

In step S102, a shared image generation process for reading out a basis matrix (basis matrix S0 or S1 to be described later) pre-stored in the HD 706 or the like, and generating shared images of the secret image acquired in step S101 is executed. That is, each component SI(x, y) of an input secret image SI undergoes the following processes.

(1) A basis matrix S0 is selected if SI(x, y) is 0 or S1 if SI(x, y) is 1.

(2) An arbitrary permutation $\Phi$ is selected from an m-th order permutation group.

(3) An (x, y) component of each shared image $w\_i$ ($1 \leq i \leq n$) before sharing is set to be a value obtained by applying the permutation $\Phi$ to the ($u\_i$)-th row component (vector of m variables) of the basis matrix.

Note that the generation process of basis matrices used in this embodiment will be explained later.

In step S103, a shared image output process for outputting the generated shared images by, e.g., the printer 715 is executed.

Steps S102 and S103 correspond to the function of the shared image generation module 306.

<Basis Matrix Generation Process>

The basis matrix generation process corresponding to the function of the conversion module 304 will be described below with reference to FIG. 2.

Figure 2:
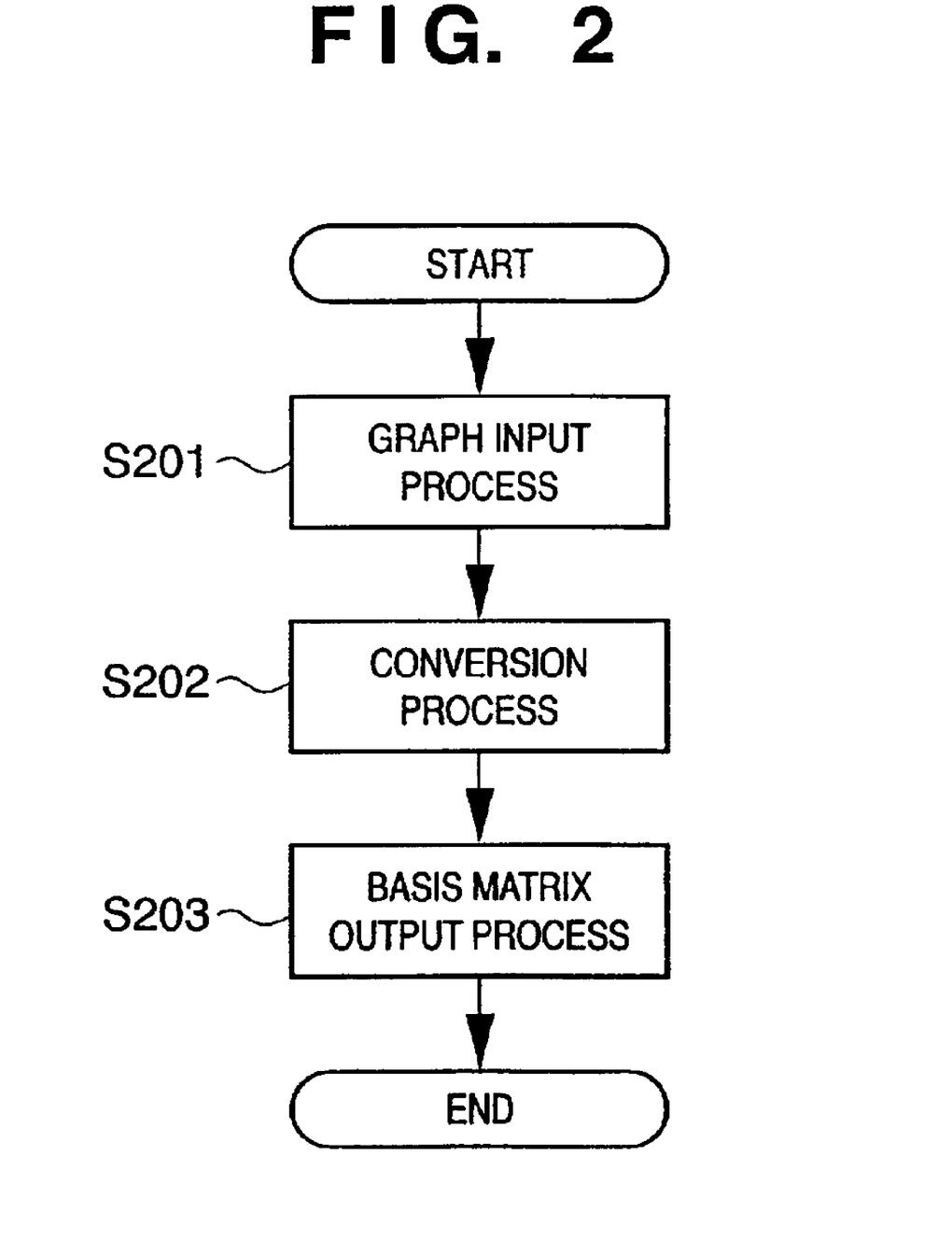
FIG. 2 is a flow chart showing the generation sequence of basis matrices in the first embodiment.

Referring to FIG. 2, a graph is input in step S201. Note that a graph G is a pair of a vertex set V and a set E of edges (elements of V×V). In this embodiment, the graph G is also described by G=(V, E).

Figure 4:
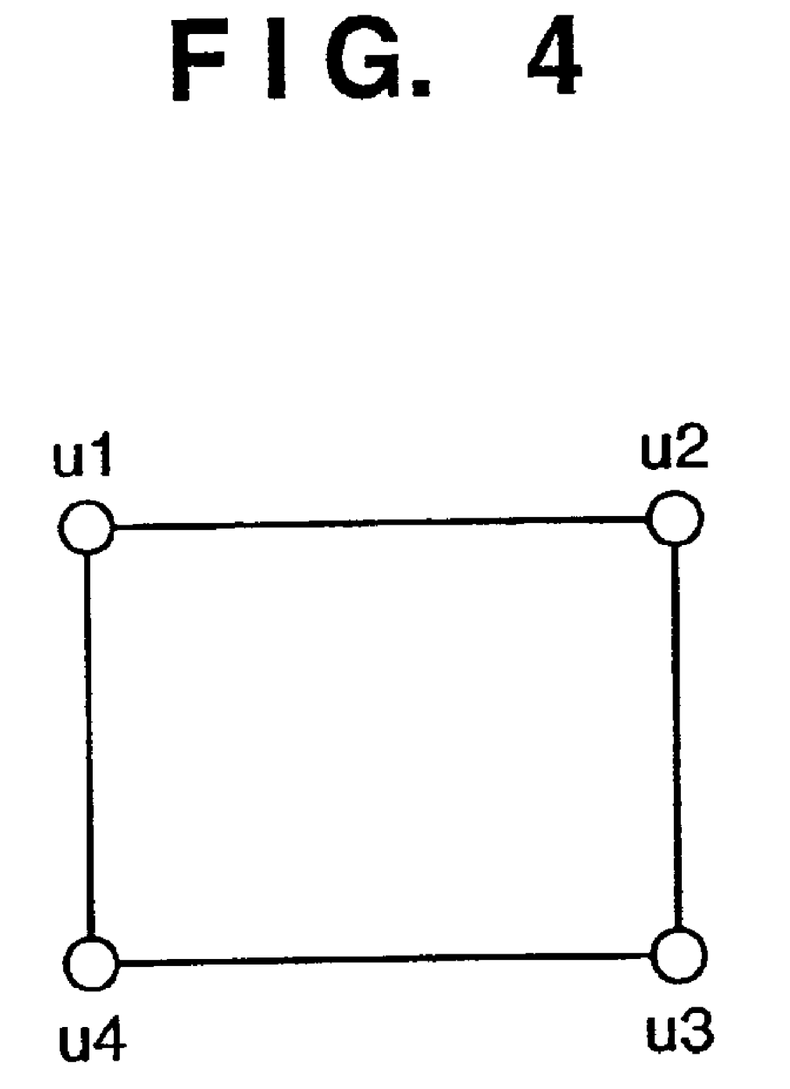
FIG. 4 shows a graph input in the first embodiment.
Figure 5:
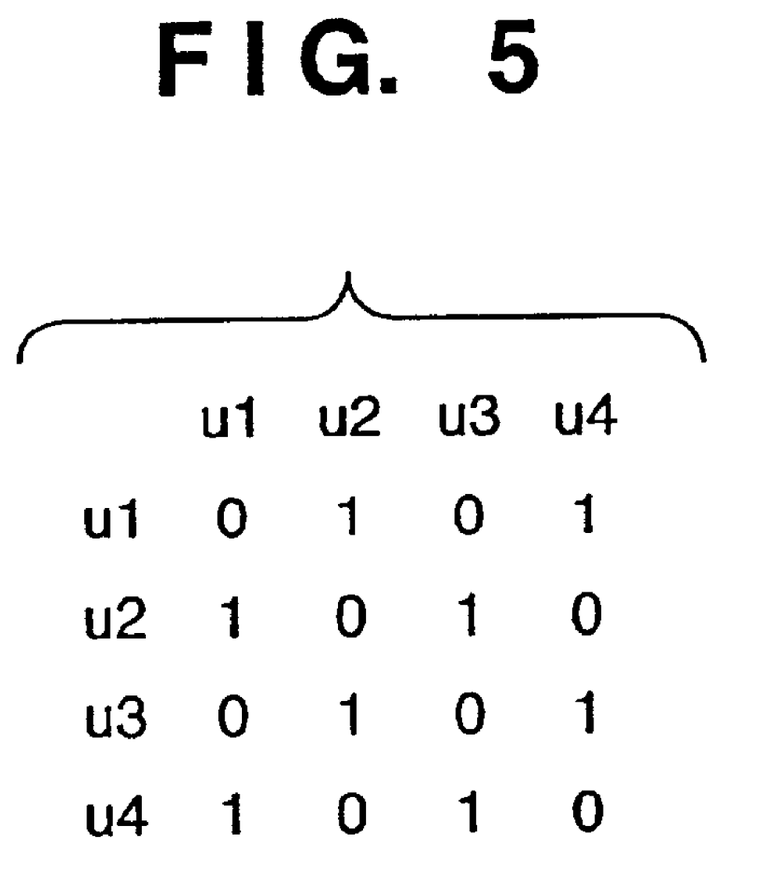
FIG. 5 exemplifies an adjacency matrix of the input graph in the first embodiment.

FIG. 4 shows a graph input in the first embodiment. An entity of the graph 302 is input in the form of an adjacent matrix shown in FIG. 5, and is stored in, e.g., the HD 706. In this embodiment, the adjacent matrix is a matrix, both the rows and columns of which are indexed by a vertex set $\{u\_i | 1 \leq i \leq n\}$, and a ($u\_x$, $u\_y$) entry is defined to be 1 if ($u\_x$, $u\_y$) $\subset$ E (edge set) or 0 if otherwise. For example, since a edge is present between $u\_1$ and $u\_2$ in FIG. 4, a (1, 2) entry in FIG. 5 is 1. However, since no edge is present between $u\_1$ and $u\_3$, a (1, 3) entry is 0.

In step S202, the input graph G is converted into a basis matrix so that an original secret image can be reconstructed by stacking up shared images distributed to a plurality of specific members. The conversion method to a basis matrix based on the graph G will be explained later.

In step S203, the basis matrix acquired in step S202 is stored in, e.g., the HD 706 or the like.

The conversion method to a basis matrix based on the graph G in step S202 will be explained below taking as an example a case wherein shared images are distributed to two members. More specifically, a case will be exemplified below wherein an access structure which allows to reconstruct an original secret image when shared images corresponding to two vertices having a distance=2 for m=5 are stacked up (overlaid on) each other is implemented.

Figure 6:
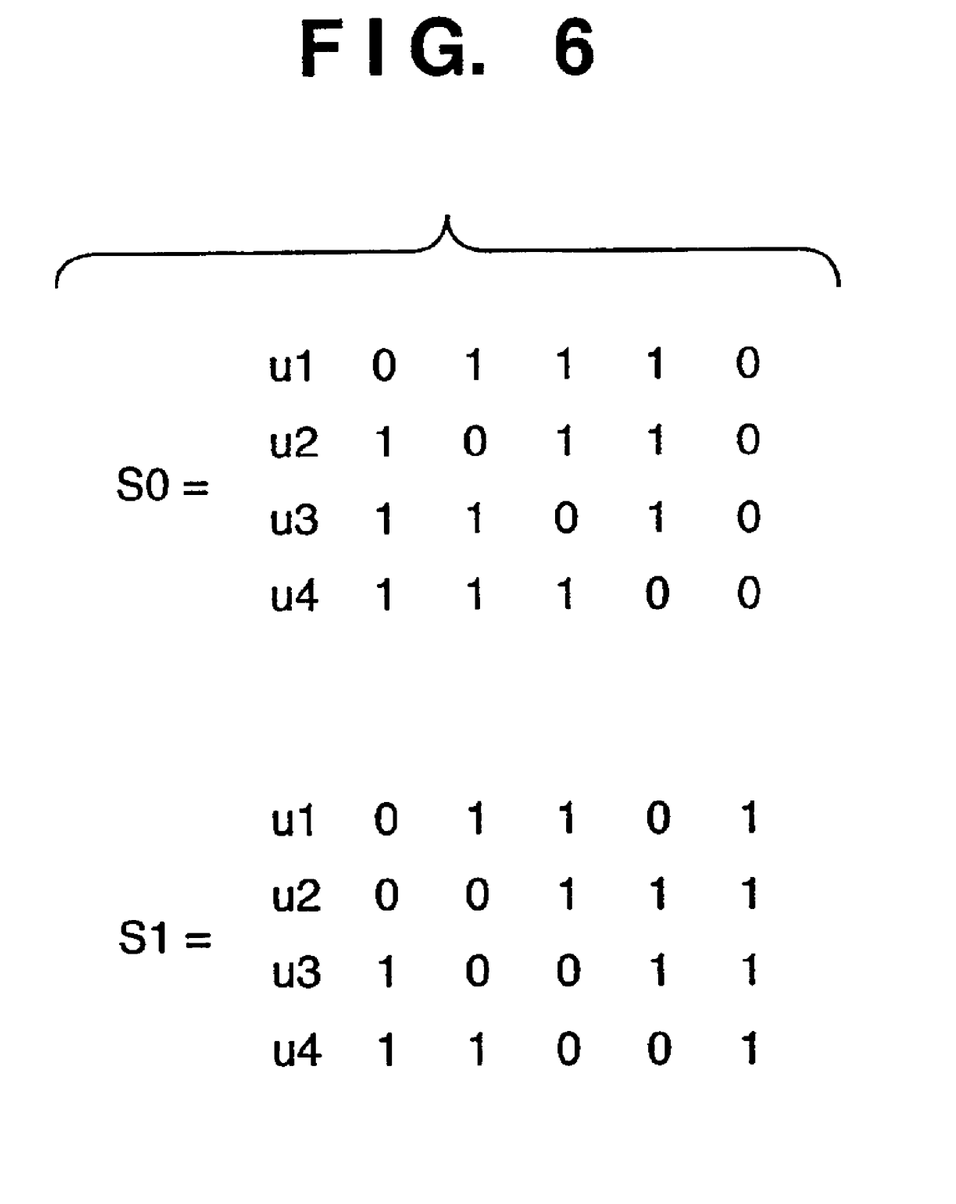
FIG. 6 shows two basis matrices in the first embodiment.

FIG. 6 shows two basis matrices in the first embodiment.

Referring to FIG. 6, a basis matrix S0 is used when the pixel component of the secret image is 0, and a basis matrix S1 is used when the pixel component of the secret image is 1. These basis matrixes are n×m matrices (4×5 matrices in this embodiment), and their rows are indexed by a vertex set $\{u\_i | 1 \leq i \leq n\}$. These basis matrices are prepared to have the following features.

Note that R(A) for a binary matrix A is defined as follows. That is, a (u_i, u_j) entry of R(A) is defined to be the Hamming distance (the number of components "1") of the vector obtained by ORing the vectors of the (u_i)- and (u_j)-th rows of binary matrix A.

(1) The basis matrices S0 and S1 are binary matrices.

(2) For i that falls within the range $1 \leq i \leq n$, the weight (the number of components "1") of the (u_i)-th row component of the basis matrix S0 equals to that of the (u_i)-th row component of the basis matrix S1.

(3) R(S0) has same entries except for diagonal entries (operation * indicates ordinary multiplication of matrices; the same applies to the following description).

(4) R(S1)–R(S0) is a constant multiple of an adjacent matrix corresponding to the distance=2 of the graph (a matrix in which entries at edges having a distance=2 are "1").

The basis matrices S0 and S1 shown in FIG. 6 satisfy the aforementioned conditions with respect to the graph shown in FIGS. 4 and 5.

According to this embodiment mentioned above, shared images w_i ($1 \leq i \leq n$) expanded to m (m=5 in this embodiment) times are generated, and shared images from which an original secret image can be reconstructed when shared images corresponding to two vertices having a distance=2 are stacked up (overlaid on) can be generated. That is, a shared image generation apparatus which can distribute shared images so that whether or not a secret image can be reconstructed is determined depending on the distance between two vertices corresponding to two members, and can assure high secrecy and manageability, can be realized.

In this embodiment, the aforementioned information sharing process is implemented on a general computer. However, the present invention is not limited to such specific system arrangement, and an apparatus comprising dedicated hardware may be used.

[Second Embodiment]

In the first embodiment described above, the shared image generation method that shares shared images to determine "whether or not a secret image can be reconstructed" depending on the distance between two vertices corresponding to two members has been explained. The second embodiment will explain a shared image generation method for "reconstructing different secret images" depending on the distance between two vertices corresponding to two members. A repetitive description of the same arrangement as in the first embodiment will be avoided, and characteristic features of this embodiment will be mainly explained.

<Basis Matrix Generation Process>

Figure 8:
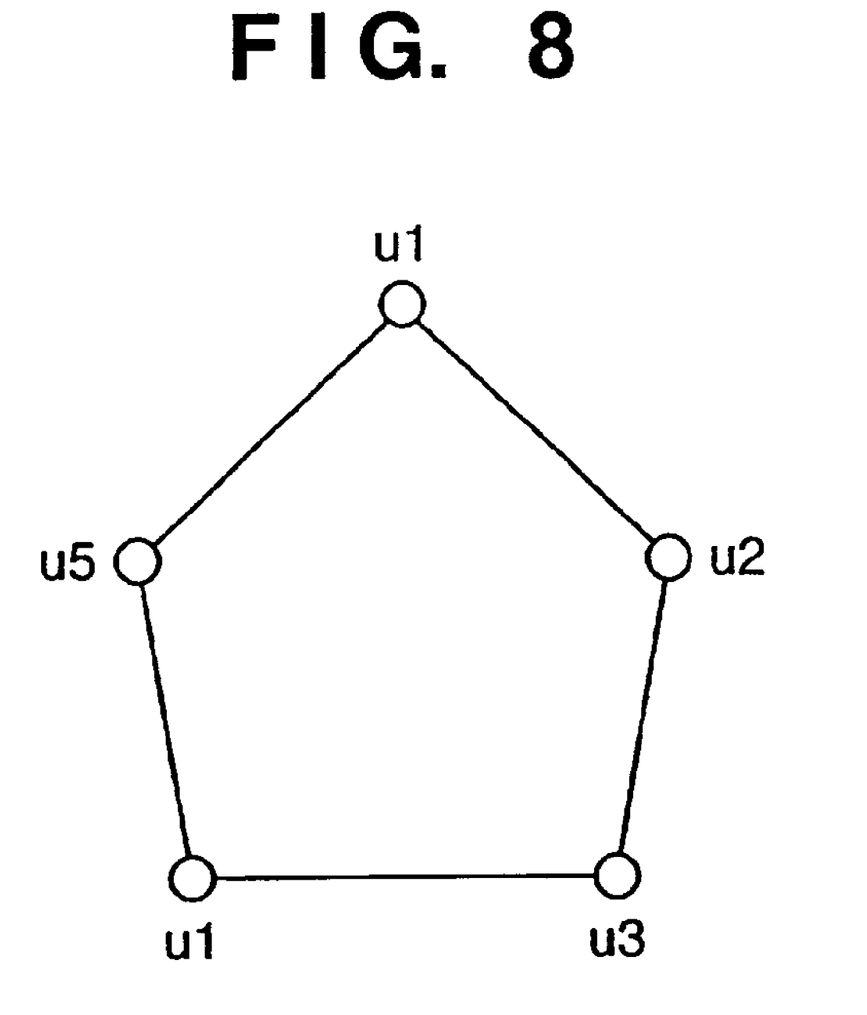
FIG. 8 shows a graph input in the second embodiment.
Figure 9:
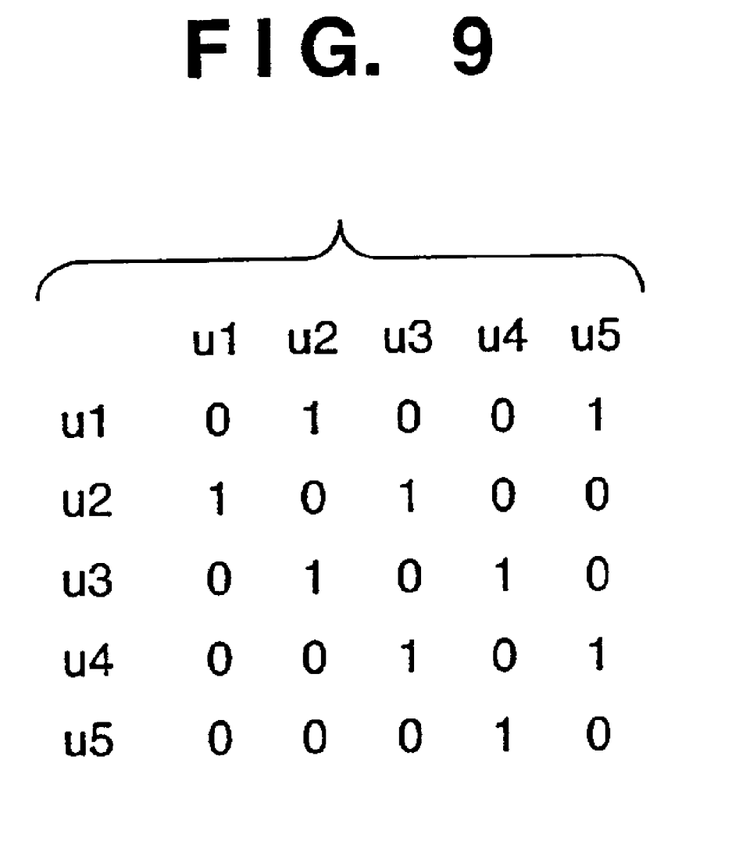
FIG. 9 exemplifies an adjacency matrix of the input graph in the second embodiment.

FIG. 8 shows a graph externally input to the shared image generation apparatus (FIG. 7) in the second embodiment in step S201 in FIG. 2. FIG. 9 is an adjacent matrix of the graph shown in FIG. 8, which is stored in the HD 706 by the graph storage module 303.

An example of step S202 in this embodiment will be explained below. In this embodiment, assume that n=5 and m=7, and the number of input secret images is 2, i.e., secret images SI_1 and SI_2 are input. Note that the secret images SI_1 and SI_2 have the same number of pixels.

The shared image generation method for reconstructing SI_1 as a secret image when the distance between two vertices corresponding to two members is 1, or SI_2 when the distance is 2 will be explained below.

Figure 10:
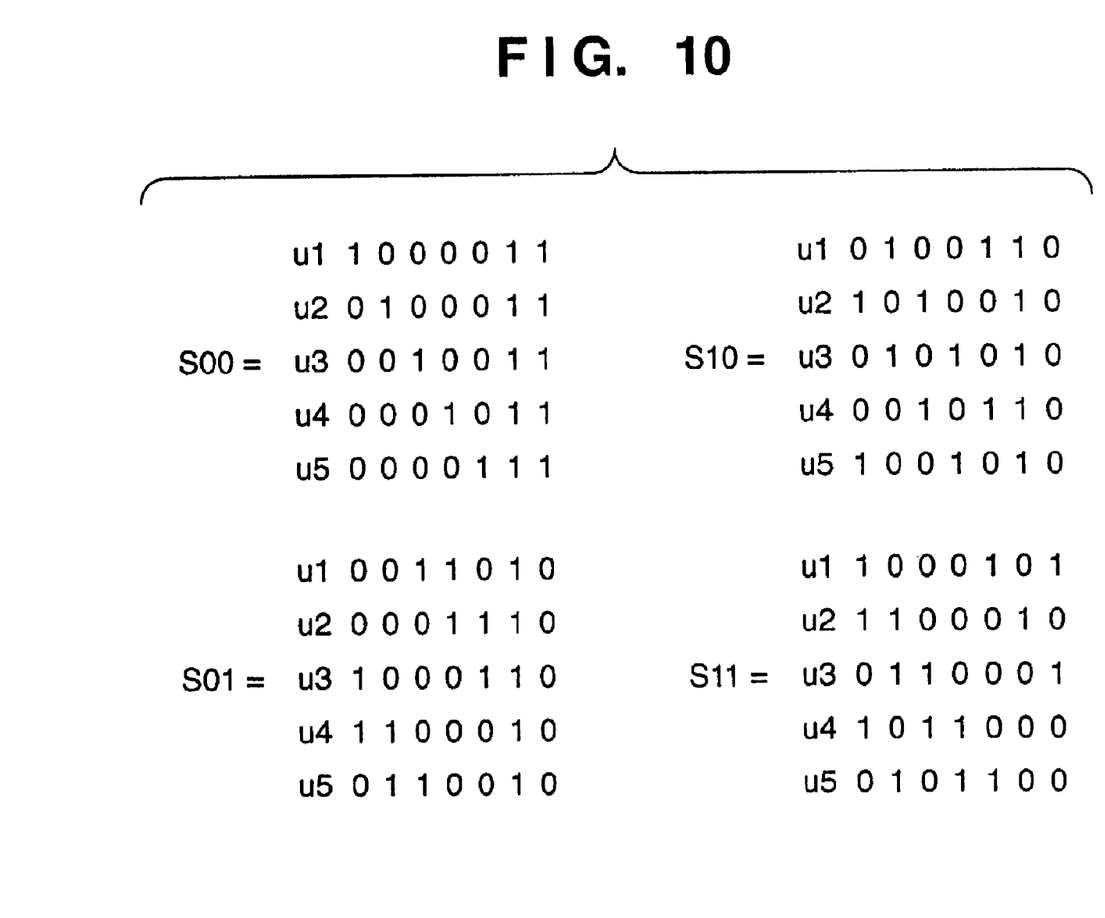
FIG. 10 shows four basis matrices in the second embodiment.

FIG. 10 shows four basis matrices in the second embodiment.

In FIG. 10,
a basis matrix S00 is used when a pixel component SI_1(x, y) of the secret image SI_1 is 0 and a pixel component SI_2(x, y) of the secret image SI_2 is 0;
a basis matrix S01 is used when SI_1(x, y)=0 and SI_2(x, y)=1;
a basis matrix S10 is used when SI 1(x, y)=1 and SI_2(x, y)=0; and
a basis matrix S11 is used when SI_1(x, y)=1 and SI_2(x, y)=1.

These four basis matrices are 5×7 matrices, and respective rows are indexed by a vertex set $\{u\_i | 1 \leq i \leq 5\}$. These basis matrices are prepared to have the following features. Note that the definition of R(A) for binary matrix A accords with that in the first embodiment described above.

(1) The basis matrices S00, S01, S10, and S11 are binary matrices.

(2) For i that falls within the range $1 \leq i \leq n$, the weights (the weights of the numbers of components "1") of the (u_i)-th row components of respective matrices Sab (a=0 or 1, b=0 or 1) match.

(3) R(S00) has same entries except for diagonal components.

(4) R(S01)–R(S00) is a constant multiple of the adjacent matrix corresponding to a distance=2 of the graph.

(5) R(S10)–R(S00) is a constant multiple of the adjacent matrix.

(6) R(S11)–R(S00) has values equal to or larger than 1 except for diagonal components.

The basis matrices S00, S01, S10, and S11 shown in FIG. 10 satisfy the aforementioned conditions for the graph shown in FIGS. 8 and 9.

In step S102 (FIG. 1) of executing the shared image generation process, respective components of the input secret images SI_1 and SI_2 undergo the following processes.

(1) when a component SI_1(x, y)=0 and SI_2(x,y)=0, the basis matrix S00 is selected. When a component SI_1(x, y)=0 and SI_2(x, y)=1, the basis matrix S01 is selected. When a component SI_1(x, y)=1 and SI_2(x, y)=0, the basis matrix S10 is selected. When a component SI_1(x, y)=1 and SI_2(x, y)=1, the basis matrix S11 is selected.

(2) An arbitrary permutation Φ is selected from an m-th order permutation group.

(3) An (x, y) component of each shared image w_i ($1 \leq i \leq n$) before sharing is set to be a value obtained by applying the permutation Φ to the (u_i)-th row component (a vector of m variables) of the basis matrix.

According to this embodiment described above, shared images w_i (1≦i≦5) expanded to m (m=7 in this embodiment) times are generated, the secret image SI_1 can be reconstructed when the distance between two vertices corresponding to two members is 1, and the secret image SI_2 can be reconstructed when the distance is 2. That is, a shared image generation apparatus which can reconstruct different secret images depending on the distance between two vertices corresponding to two members, and can assure high secrecy and manageability can be realized.

[Third Embodiment]

In the first and second embodiments, the access structure to a secret image in consideration of the distance between two points corresponding to two members is implemented. Also, this access structure can be expanded to a determination method based on three or more members. In this case, a method of computing the sum of distances from distances between a vertices (a>2) each other corresponding to a members, a method of computing a minimum distance, a method of computing a maximum distance, and the like may be used.

[Fourth Embodiment]

In the first to third embodiments, as a graph input to the shared image generation apparatus (FIG. 7), only an undirected graph is used. Alternatively, the present invention may be expanded to a method using a weighted graph. In this case, the distance in each embodiment is replaced by the weight on the edge.

[Other Embodiment]

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, magneto-optical disk, CD-ROM, CD-R, CD-RW, DVD-ROM, DVD-RAM, DVD–RW, DVD+RW, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

To restate, according to the above embodiments, a shared image generation apparatus and method, a computer program, and a computer readable storage medium which can assure high secrecy and manageability can be provided.

As many apparently widely different embodiments of the present invention can be made without departing from the spirit and scope thereof, it is to be understood that the invention is not limited to the specific embodiments thereof except as defined in the claims.

What is claimed is:

1. A shared image generation apparatus for generating a plurality of shared images to be distributed to a plurality of members from a secret image to be managed, comprising:

graph input means for externally inputting a graph, a vertex set of which corresponds to a set of the plurality of members;

matrix generation means for generating a basis matrix on the basis of the graph input by said graph input means; and shared image generation means for generating a plurality of shared images to be distributed to the plurality of members on the basis of the externally input secret image and the basis matrix acquired by said matrix generation means, wherein the plurality of shared images form the secret images when the shared images are stacked up.

2. The apparatus according to claim 1, wherein the plurality of members are a (a>2) members, and said shared image generation means generates the plurality of shared images to determine, whether or not the secret image can be reconstructed, on the basis of distances between vertices in the graph that correspond to the a members.

3. The apparatus according to claim 2, wherein said shared image generation means calculates a sum w of the distances between vertices in the graph that correspond to the a members, and generates the plurality of shared images to determine, whether or not the secret image can be reconstructed, on the basis of the calculated w.

4. The apparatus according to claim 2, wherein said shared image generation means calculates a minimum distance y of the distances between vertices in the graph that correspond to the a members, and generates the plurality of shared images to determine, whether or not the secret image can be reconstructed, on the basis of the calculated y.

5. The apparatus according to claim 1, wherein the plurality of members are a (a>2) members, and said shared image generation means generates the plurality of shared images to reconstruct different secret images to the a members on the basis of distances between vertices in the graph that correspond to the a members.

6. The apparatus according to claim 5, wherein said shared image generation means calculates a sum w of the distances between vertices in the graph that correspond to the a members, and generates the plurality of shared images to reconstruct different secret images to the a members on the basis of the calculated w.

7. The apparatus according to claim 5, wherein said shared image generation means calculates a minimum distance y of the distances between vertices in the graph that correspond to the a members, and generates the plurality of shared images to reconstruct different secret images to the a members on the basis of the calculated y.

8. The apparatus according to claim 5, wherein said shared image generation means calculates a maximum distance z of the distances between vertices in the graph that correspond to the a members, and generates the plurality of shared images to reconstruct different secret images to the a members on the basis of the calculated z.

9. The apparatus according to claim 1, wherein the plurality of members are two members, and said shared image generation means generates two shared images to determine, whether or not the secret image can be reconstructed, on the basis of a distance between two vertices in the graph that correspond to the two members.

10. The apparatus according to claim 1, wherein the plurality of members are two members, and said shared image generation means generates the two shared images to reconstruct different secret images to the two members on the basis of a distance between two vertices in the graph that correspond to the two members.

11. The apparatus according to claim 1, wherein the graph is a weighted graph.

12. The apparatus according to claim 11, wherein said shared image generation means generates the plurality of shared imaged to determine, whether or not the secret image can be reconstructed, on the basis of weights of edges in the graph.

13. A shared image generation method for generating a plurality of shared images to be distributed to a plurality of members from a secret image to be managed, comprising:

the graph input step of externally inputting a graph, a vertex set of which corresponds to a set of the plurality of members;

the matrix generation step of generating a basis matrix on the basis of the graph input in the graph input step; and the shared image generation step of generating a plurality of shared images to be distributed to the plurality of members on the basis of the externally input secret image and the basis matrix acquired in the matrix generation step, wherein the plurality of shared images form the secret images when the shared images are stacked up.

14. The method according to claim 13, wherein the plurality of members are a (a>2) members, and the shared image generation step includes the step of generating the plurality of shared images to determine, whether or not the secret image can be reconstructed, on the basis of distances between vertices in the graph that correspond to the a members.

15. The method according to claim 13, wherein the plurality of members are a (a>2) members, and the shared image generation step includes the step of generating the plurality of shared images to reconstruct different secret images to the a members on the basis of distances between vertices in the graph that correspond to the a members.

16. A computer program for instructing a computer to operate as the shared image generation apparatus as set forth in claim 1.

17. A computer program for instructing a computer to implement a shared image generation method as set forth in claim 13.

18. A computer readable storage medium storing the computer program as set forth in claim 16.

19. A computer readable storage medium storing the computer program as set forth in claim 17.

* * * * *

UNITED STATES PATENT AND TRADEMARK OFFICE
CERTIFICATE OF CORRECTION

| | | |
|---|---|---|
| PATENT NO. | : 6,975,760 B2 | Page 1 of 1 |
| APPLICATION NO. | : 09/949617 | |
| DATED | : December 13, 2005 | |
| INVENTOR(S) | : Yuji Suga | |

It is certified that error appears in the above-identified patent and that said Letters Patent is hereby corrected as shown below:

COLUMN 2

Line 4, "up" should read --up on--.

COLUMN 11

Line 8, "imaged" should read --images--.

Signed and Sealed this

First Day of May, 2007

JON W. DUDAS
*Director of the United States Patent and Trademark Office*